United States Patent
Hwang (12)

(10) Patent No.: US 6,290,066 B1
(45) Date of Patent: Sep. 18, 2001

(54) METHOD FOR REMOVAL OF AMMONIA FROM FLY ASH

(75) Inventor: Jiann-Yang Hwang, Houghton, MI (US)

(73) Assignee: Board of Control for Michigan Technological University, Houghton, MI (US)

( * ) Notice: Subject to any disclaimer, the term of this patent is extended or adjusted under 35 U.S.C. 154(b) by 0 days.

(21) Appl. No.: 09/277,587

(22) Filed: Mar. 26, 1999

Related U.S. Application Data

(60) Provisional application No. 60/079,461, filed on Mar. 26, 1998.

(51) Int. Cl.[7] ............... C01C 1/02; C01C 1/10; C04B 18/08
(52) U.S. Cl. .......... 209/164; 423/237; 423/238; 423/352
(58) Field of Search .............. 209/164; 423/237, 423/238, 352

(56) References Cited

U.S. PATENT DOCUMENTS

| | | |
|---|---|---|
| 4,121,945 | * 10/1978 | Hurst . |
| 4,288,420 | 9/1981 | Ito et al. . |
| 4,911,900 | 3/1990 | Horch et al. . |
| 5,211,926 | * 5/1993 | Martin et al. . |
| 5,227,047 | 7/1993 | Hwang . |
| 5,456,363 | 10/1995 | Groppo et al. . |

FOREIGN PATENT DOCUMENTS

| | | |
|---|---|---|
| 30 32 927 A1 | 3/1981 | (DE) . |
| 35 26 756 A1 | 1/1987 | (DE) . |
| 3711503 | * 10/1988 | (DE) . |
| 38 02 884 A1 | 8/1989 | (DE) . |
| 3815963 | * 11/1989 | (DE) . |
| 135148 | * 3/1985 | (EP) . |
| 0 135 148 A1 | 3/1985 | (EP) . |
| 0 264 041 B1 | 4/1992 | (EP) . |
| 492540 | * 7/1992 | (EP) . |
| 538647 | * 4/1993 | (EP) . |
| 56-166978 | * 12/1981 | (JP) . |
| 57-065314 | * 4/1982 | (JP) . |
| 57 065314 | 4/1982 | (JP) . |
| 58-058182 | * 4/1983 | (JP) . |
| 59-010327 | * 1/1984 | (JP) . |
| 59-059237 | * 4/1984 | (JP) . |
| 94/08892 | * 4/1994 | (WO) . |

* cited by examiner

*Primary Examiner*—Thomas M. Lithgow
(74) *Attorney, Agent, or Firm*—Killworth, Gottman, Hagan & Schaeff, LLP

(57) ABSTRACT

A method for removing ammonia and ammonia compounds from fly ash and other combustion by-products is provided. The method may be performed with raw or processed fly ash, or it may be performed in conjunction with a wet beneficiation process. The method involves mixing the ammonia-contaminated fly ash with water and then filtering and/or drying the solution to remove the ammonia and water. The method produces fly ash having an ammonia content of less than about 60–80 ppm, which allows the fly ash to be utilized in a number of applications.

5 Claims, 1 Drawing Sheet

METHOD FOR REMOVAL OF AMMONIA FROM FLY ASH

CROSS REFERENCE TO RELATED APPLICATIONS

This application claims the benefit of U.S. provisional application Ser. No. 60/079,461, filed Mar. 26, 1998.

BACKGROUND OF THE INVENTION

The present invention relates to a method for removing of ammonia and ammonia compounds from fly ash and other combustion byproducts.

In recent years, there has been increasing public and government concern over the environmental impact of nitrogen oxides ($NO_x$) emissions, which contributes to the environmental impact of acid rain. Power plants and other industrial plants based on combustion processes are by far the largest producers of $NO_x$ pollution. In the United States, the Clean Air Act Amendment of 1990 called for a significant reduction in the $NO_x$ emissions from such plants.

It is known in the art that ammonia or ammonia compounds can be utilized to reduce nitrogen oxides emissions by selective catalytic or non-catalytic reduction. Ammonia or ammonia compounds react with and convert the nitrogen oxides to nitrogen. The following is an example of the reaction: $NH_3 + 4\ NO + O_2 \rightarrow 4\ N_2 + 6\ H_2O$.

However, while ammonia has been used successfully to reduce nitrogen oxide emissions, the ammonia is typically introduced in excess for the reaction and is not totally consumed. Therefore, residues from the combustion process such as fly ash and other combustion byproducts will contain ammonia and/or ammonia compounds (such as ammonia sulfates, ammonia chlorides, ammonia hydroxide, ammonia carbonates).

Ammonia has also been utilized to help reduce particulate emissions, which are closely regulated by the government. For example, ammonia can be added as a conditioning agent in electrostatic precipitators to modify the properties of fly ash for improved collection efficiency. In this process, ammonia and ammonia compounds are also deposited on fly ash. See J. R. Turner et al in 1994,(1.R. Turner, S. Chone and M. P. Dudukovic, "Ammonia/Fly ash Interaction and Their Impact on Flue Gas Treatment Technologies," *Chemical Engineering Science*, V. 49,No. 24A, pp, 4315–4325, 1994.)

The deposition of ammonia and ammonia compounds on combustion by-products such as fly ash can cause problems for the utilization of the by-products. For example, about 10 million tons of fly ash are currently utilized annually in the United States for concrete applications. When ammonia-contaminated fly ash is used in such applications, hazardous levels of ammonia odor may be generated. Concentrations of ammonia as low as 100 ppm can be an odor irritant as well as an irritant to the eyes. In order to use the fly ash in concrete or other applications, the ammonia content of the fly ash should desirably be below 60–80 ppm (0.060–0.080 mg $NH_3$/g fly ash). Accordingly, it is important to reduce or remove ammonia and ammonia compounds from combustion by-products such as fly ash prior to their utilization in other applications.

U.S. Pat. No. 4,288,420 teaches a method for the removal of nitrogen oxides and ash from a coal-fired boiler by treatment with ammonia in which the ammonia is separated from the coal ash by heating the exhaust gas at a temperature of 350 to 700° C. U.S. Pat. No. 4,911,900 describes the combination of various ammonia stripping and scrubbing processes to recover ammonia for nitrogen oxide reduction. However, these methods are focused on the recovery of ammonia for reuse in nitrogen oxides reduction, and do not provide a method for the removal of residual ammonia on fly ash which is to be used in other applications.

Many processes have been developed for the beneficiation of fly ash. For example, U.S. Pat. Nos. 5,227,047 and 5,456,363 describe wet processes including froth flotation, magnetic separation and others to separate various fly ash components, such as carbon, aluminum silicates, cenospheres, and iron oxides. However, these processes do not consider the effects of ammonia on the separated products. For example, when the ammonia contaminated fly ash is subjected to such beneficiation processes, ammonia and its compounds are dissolved in the process water. If the separated products are utilized while containing a portion of the process water, ammonia contaminants may still be present in the separated products, causing possible problems for their utilization. In addition, the process water is frequently filtered from the separated products and recirculated. Thus, the ammonia concentration in the process water can build up to very high concentrations.

Accordingly, there is still a need in the art for a method of reducing or removing ammonia and/or ammonia compounds from combustion by-products such as fly ash prior to their utilization.

SUMMARY OF THE INVENTION

The present invention meets that need by providing a method for removing ammonia from combustion by-products such as fly ash which utilizes treatment with water and/or heat to reduce the ammonia content of the fly ash to an acceptable level of less than about 60–80 ppm. By "ammonia", hereinafter, it is meant ammonia and ammonia compounds such as ammonia sulfates, ammonia chlorides, ammonia hydroxide, ammonia carbonates.

According to one aspect of the present invention, a method for removing ammonia from fly ash in a wet beneficiation process is provided comprising the steps of mixing raw fly ash containing ammonia and other components with water to form an aqueous slurry, separating and collecting an amount of at least one of the other components from the slurry, and then filtering the slurry to separate the ammonia and water from the fly ash such that the filtered fly ash contains less than about 60–80 ppm ammonia.

The filtering step preferably includes the step of washing the filtered fly ash with water which contains no ammonia compounds, referred to herein as "wash water". The method also preferably includes the step of heating the filtered fly ash at a temperature of at least 100° C. In this embodiment, the water in the slurry is preferably maintained at a pH of greater than about 9.The wash water is also preferably maintained at a pH of greater than about 9.

In another embodiment of the invention, a method for removing ammonia from fly ash is provided in which raw or processed fly ash containing ammonia is mixed with water to form a solution such that the ammonia is dissolved into the water. By "processed" fly ash, it is meant fly ash that has undergone a beneficiation process to separate one or more components such as carbon from the fly ash. The water in this embodiment is preferably used in amount of at least about 0.1 to 5% by weight of the total fly ash/water mixture, and more preferably, from about 50–70% by weight. In embodiments where the water is used in smaller amounts, e.g. about 5% or less, the water may be in the form of steam.

The solution is then filtered to remove the ammonia and water such that the fly ash has an ammonia content of less than about 60–80 ppm. This method may further include the step of drying the filtered fly ash by heating at a temperature of at least room temperature. More preferably, the drying step is conducted at a temperature of between about 80° C. to about 250° C.

In an alternative embodiment of the invention, the raw or processed fly ash is mixed with water and then dried at a temperature of at least room temperature, and more preferably, at a temperature of between about 80° C. to about 250° C. This method may optionally include a filtering step. In this embodiment, the water preferably comprises less than about 25% by weight of the total fly ash/water mixture. The water may also be in the form of steam.

In yet another embodiment of the invention, a method is provided for removing ammonia from ammonia-contaminated fly ash which does not utilize water. This method comprises the steps of providing an amount of raw or processed fly ash containing ammonia, and heating the fly ash at a temperature of between about 100° C. to about 500° C. for a time sufficient to reduce the ammonia content of said fly ash to less than about 60–80 ppm. More preferably, the fly ash is heated at a temperature between about 200° C. to about 400° C.

The resulting fly ash may be used in a number of applications including concrete, fillers, pozzolanic material, and the like. While the method of the present invention is described with regard to the removal of ammonia from fly ash, it should also be appreciated that the process may be applied to other combustion by-products such as combustion residues resulting from burning coal, oil, biomass, tires, plastics and other combustible materials.

Accordingly, it is a feature of the present invention to provide a method for removing ammonia from fly ash so that it may be utilized in other applications. This, and other features and advantages of the present invention will become apparent from the following detailed description, the accompanying drawings, and the appended claims.

DETAILED DESCRIPTION OF THE PREFERRED EMBODIMENT

Figure 1:
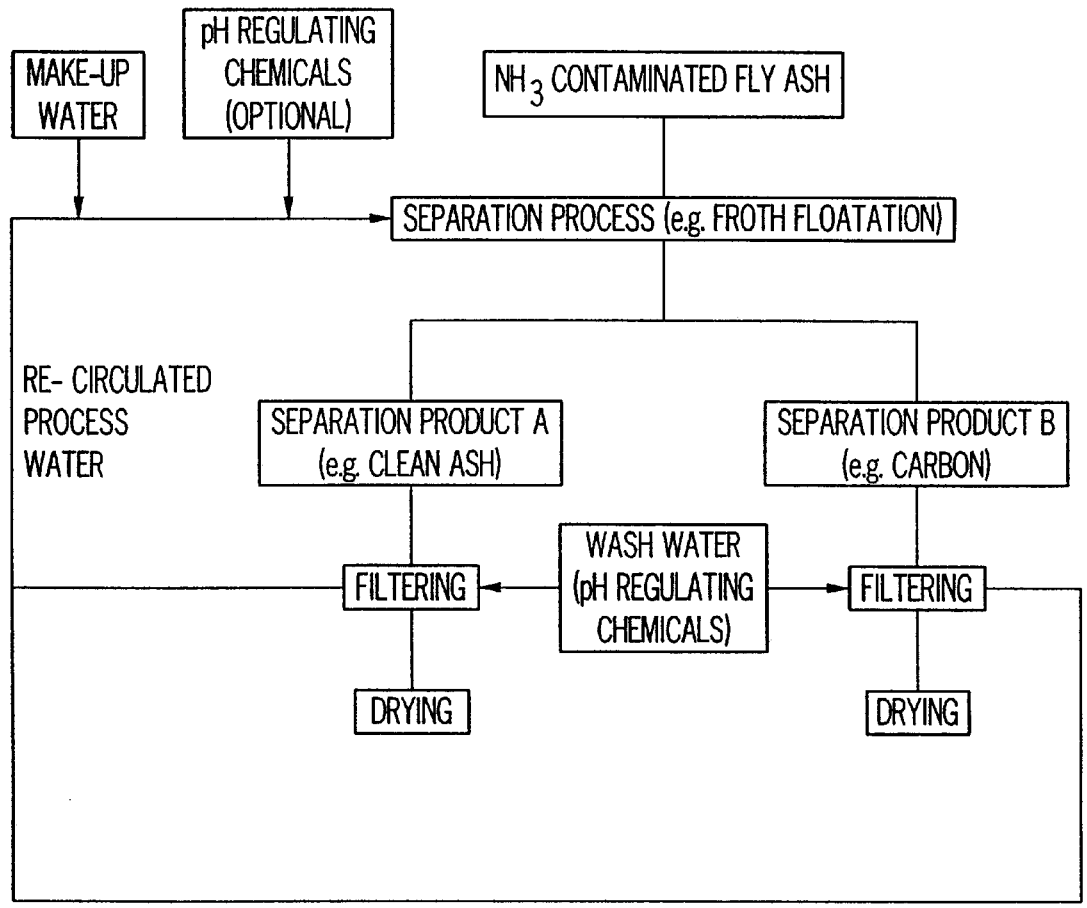
FIG. 1 is a schematic view illustrating one method of the present invention.

The method of the present invention is effective in removing a substantial portion of ammonia from raw or processed fly ash or other combustion by-products such that the resulting fly ash has an acceptable level of ammonia which will not cause any deleterious effects when the fly ash is utilized in concrete and other applications.

The ammonia may be removed from the fly ash in a number of ways. In one method, ammonia is removed from fly ash during a wet beneficiation process. Wet beneficiation processes are well known in the art and typically utilize a froth flotation machine or magnetic separation unit to separate various fly ash components such as carbon, aluminum silicates, cenospheres and iron oxides from the fly ash. In a typical process utilizing froth flotation, fly ash is mixed with a liquid such as water in the machine to form a slurry. Frothing agents are then introduced to separate components such as carbon from the fly ash, which float to the top of the machine and are skimmed off the surface. The remaining fly ash is filtered by collection on a filter cake.

In this method, the ammonia is removed from the fly ash during the filtering step by washing the filter cake with wash water. By washing the ammonia-contaminated filter cake with wash water, the ammonia dissolves in the water and the ammonia content of the filtered fly ash is reduced to an acceptable level. It should be appreciated that the wash water may be provided in the form of steam which may be injected directly into the filter cake. The steam causes water condensation on the fly ash which dissolves the ammonia. The filtered wash water can then be circulated back for processing.

The pH of the wash water is preferably maintained at above 9 to assist the evaporation of ammonia from water and, thus, reduce the quantity of water required to wash the filter cake. The pH of the water used to mix with the fly ash (referred to as "process water") is also preferably maintained at a pH above 9 during the process so that ammonia build-up in the process water can be reduced. The pH is preferably maintained at this level with the use of lime or sodium hydroxide.

An alternative method for reducing the ammonia content of the wash water or process water is an air stripping technique in which ammonia ($NH_4+$) is converted to free ammonia ($NH_3$). In this method, the water is maintained at a pH above about 9 and air is bubbled through the water such that ammonia is stripped off from the water into the air. Other methods for reducing the ammonia concentration in the wash or process water include ion exchange, oxidation (e.g., chlorination), ultrafiltration, and biological treatment.

The filter cake is preferably dried by heating to aid in the removal of ammonia and water. During the drying step, both the ammonia and the water will be evaporated. Drying is preferably achieved at temperatures above 100° C., but it should be appreciated that lower temperatures may be used when the fly ash is dried under vacuum or with dry air.

The above-described method is illustrated schematically in FIG. 1. As shown, ammonia-contaminated fly ash undergoes a separation process such as froth flotation and is separated into clean ash and other separation products such as carbon. The clean ash is then filtered using a filter cake which is then washed with wash water. The filtered ash is then dried by heating as described above. As illustrated in FIG. 1, the separated products may also be treated by filtering and drying to remove ammonia. For example, separated products such as carbon may be subjected to the same ammonia removal method and then re-used in coal-burning facilities.

In embodiments where it is desired to remove ammonia from raw fly ash or from processed fly ash which has already been separated by a dry or wet beneficiation process, the method may be performed by mixing the raw or processed fly ash with water or steam. The ammonia then dissolves into the water and the solution is then filtered using a filter cake as described above. We have found that water may be used in amounts as little as 0.1% by weight of the total fly ash/water mixture to remove ammonia. However, it should be appreciated that higher amounts of water result in a higher reduction in ammonia levels.

In this embodiment, a filtration step may or may not be needed, depending on the amount of water used. For example, when water is used in an amount of less than about 25% by weight of the total fly ash/water mixture, a filtration step is generally unnecessary. However, when larger amounts of water are used, e.g., from greater than about 50–70% by weight water, a filtration step is desired.

In an alternative embodiment, the ammonia removal may be performed without using water, i.e., the use of heat alone may be used to drive ammonia from the raw or processed fly ash. This can be accomplished by heating the fly ash at temperatures between about 100° C. and 500° C., and more preferably, between about 200° C. to 400° C.

In order that the invention may be more readily understood, reference is made to the following examples, which are intended to be illustrative of the invention, but are not intended to be limiting in scope.

EXAMPLE 1

To simulate a situation where fly ash is subjected to a wet beneficiation process in which the process water contains ammonia or ammonia compounds, 200 grams of a fly ash sample containing 7.56% carbon was mixed with 1000 ml of water containing 5000 ppm ammonia in a froth flotation machine. Fuel oil (3 drops) was added, then pine oil (1 drop) was added as a frother. After introducing air into the froth flotation machine, the carbon in the fly ash floated to the top of the pulp. The floated carbon was skimmed off and collected as the carbon concentrate (25.2 grams with 60.3% carbon). After 3 minutes of froth flotation, the materials that remained in the flotation cell were collected as the clean ash product (194 grams with 0.74% carbon). The cleaned ash was filtered using a filter cake. The filter cake was washed with water while filtering. The ash was then dried at 100° C. The ammonia content of the clean ash was determined to be 3.54 ppm. The carbon concentrate was then filtered and the filter cake was washed with water while filtering. The amount of wash water was about 50 grams. After washing and filtering, the carbon concentrate was dried at 100° C. The ammonia content on the carbon was determined to be 39.29 ppm.

EXAMPLE 2

In this example, a series of tests were conducted to determine if heating would assist in removal of ammonia from fly ash in a wet beneficiation process.

200 grams of the fly ash sample from Example 1 were mixed with 800 grams of water containing ammonia at concentrations ranging from 500 ppm to 10,000 ppm. The fly ash was then filtered using a filter cake. The fly ash filter cake contained about 22% moisture. The filter cake was placed in an oven at a temperature of 200° C. After drying in the oven for 2 hours, the $NH_3$ content of the fly ash was determined. The results are shown in Table 3.

TABLE 3

Ammonia Content On Fly Ash

| $NH_3$ Concentration of Solution (ppm) | $NH_3$ Content of Dried Fly Ash (ppm) |
| --- | --- |
| 10,000 | 11.59 |
| 5,000 | 1.15 |
| 2,000 | 0.92 |
| 1,000 | 0.89 |
| 500 | 0.82 |

EXAMPLE 3

A raw fly ash sample containing 134 ppm ammonia was obtained from a power plant. For each test, 100 grams of sample were placed in a furnace at a preset temperature for two hours. The temperature of the study ranged from 100° to 500° C. After heating, the ammonia content of each sample was determined. The results are shown in Table 1.

TABLE I

| Temperature (° C.) | $NH_3$ Content (ppm) |
| --- | --- |
| Room temperature | 134 |
| 100 | 74.6 |
| 200 | 52.2 |
| 300 | 9.4 |
| 400 | 1.2 |
| 500 | 2.1 |

Table I shows that the ammonia content in raw fly ash can be reduced from 134 ppm to 74.6 ppm at 100° C. in two hours. Higher temperature heating can further reduce the ammonia content and/or the heating time.

EXAMPLE 4

About 200 grams of the raw fly ash from Example 2 were mixed with 800 grams of water and then filtered using a filter cake. The filtrate solution was determined to have 33.5 ppm ammonia content. The results show that ammonia is almost completely desorbed from fly ash and dissolved into water. By filtering to remove the water, the ammonia was removed.

EXAMPLE 5

A raw fly ash sample as described in Example 3 was obtained. Water was added to three samples to reach a moisture content of 5%, 10%, and 15%, respectively. The 5% moisture test contained 95 grams of a fly ash sample and 5 grams of water; the 10% moisture test contained a 90 gram fly ash sample and 10 grams of water; and the 15% moisture test contained an 85 gram fly ash sample and 15 grams of water. After the addition of water, the materials were thoroughly mixed and then placed in an oven for drying at 300° F. After drying, the ammonia content of the fly ash was determined. The results show that the ammonia content was reduced from 134 ppm to 11.79 ppm, 6.40 ppm, and 1.60 ppm for the 5%, 10%, and 15% moisture test, respectively.

EXAMPLE 6

A raw fly ash sample as described in Example 3 was obtained. The moisture content for each sample tested was maintained at 15% by adding 15 grams of water to 95 grams of fly ash. After mixing, the samples were dried at various temperatures, including room temperature, 200° F. and 300° F. The results show that the ammonia content of fly ash was reduced from 134 ppm. to 2.13 ppm, 4.81 ppm, and 1.60 ppm at temperatures of room temperature, 200° F., and 300° F., respectively.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for removing ammonia from fly ash in a wet beneficiation process comprising:

providing an amount of raw fly ash containing ammonia and other components;

mixing said fly ash with water to form an aqueous slurry; wherein said water is maintained at a pH of greater than 9;

separating and collecting at least one of said other components from said slurry; and filtering said slurry to separate said ammonia and said water from said fly ash; and washing said filtered fly ash with wash water such that the filtered fly ash contains less than about 60–80 ppm ammonia.

2. The method of claim 1 wherein said wash water is maintained at a pH of greater than about 9.

3. The method of claim 1 further including the step of heating said filtered fly ash at a temperature of at least 100° C.

4. A method for removing ammonia from ammonia-contaminated fly ash comprising the steps of:

providing an amount of raw or processed fly ash containing ammonia;

mixing said fly ash with water; wherein said water is in the form of steam and comprises from about 0.1 to 5% by weight of the total fly ash/water mixture; and heating said fly ash at a temperature of between about 80° C. and 250° C.

5. A method for removing ammonia from fly ash in a wet beneficiation process comprising the steps of:

providing an amount of raw fly ash containing ammonia and other components;

mixing said fly ash with water to form an aqueous slurry;

separating and collecting at least one of said other components from said slurry; and filtering said slurry to separate said ammonia and said water from said fly ash; and washing said filtered fly ash with wash water such that the filtered fly ash contains less than about 60–80 ppm ammonia; wherein said wash water is recirculated for use in said beneficiation process.

* * * * *